(12) United States Patent
Andersen et al.

(10) Patent No.: US 11,713,837 B2
(45) Date of Patent: Aug. 1, 2023

(54) TUBE ASSEMBLY, PRESSURE EXCHANGER AND REVERSE OSMOSIS SYSTEM

(71) Applicant: Danfoss A/S, Nordborg (DK)

(72) Inventors: Stig Kildegaard Andersen, Krusaa (DK); Tommi Kolb, Nordborg (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 17/548,759

(22) Filed: Dec. 13, 2021

(65) Prior Publication Data

US 2022/0196189 A1 Jun. 23, 2022

(30) Foreign Application Priority Data

Dec. 18, 2020 (EP) .................................. 20215491

(51) Int. Cl.
*F16L 15/02* (2006.01)
*F16L 15/00* (2006.01)
*F16L 58/18* (2006.01)
*F16L 15/04* (2006.01)

(52) U.S. Cl.
CPC ............. *F16L 15/006* (2013.01); *F16L 15/02* (2013.01); *F16L 58/182* (2013.01); *F16L 15/04* (2013.01)

(58) Field of Classification Search
CPC ... F16L 27/127; F16L 27/1275; F16L 27/125; F16L 27/12; F16L 15/02; F16L 27/12757
USPC .............................. 285/302, 301, 404, 90, 92
See application file for complete search history.

(56) References Cited

U.S. PATENT DOCUMENTS

| 2,575,685 A | | 11/1951 | Shugart et al. | |
|---|---|---|---|---|
| 2,805,873 A | | 9/1957 | Brennan et al. | |
| 3,284,561 A | * | 11/1966 | Clements | F16L 25/01 439/108 |
| 3,907,334 A | * | 9/1975 | Schera, Jr. | F16L 27/1275 285/302 |
| 3,994,516 A | | 11/1976 | Fredd | |
| 4,083,410 A | * | 4/1978 | Anderson | A62C 37/10 285/302 |
| 4,907,828 A | | 3/1990 | Chang | |

(Continued)

FOREIGN PATENT DOCUMENTS

| GB | 2490336 A | 10/2012 |
|---|---|---|
| WO | 2016/174687 A1 | 11/2016 |
| WO | 2020/008428 A1 | 1/2020 |

OTHER PUBLICATIONS

First Examination Report for Indian Patent Application No. 202114057090 dated Aug. 1, 2022.

*Primary Examiner* — David Bochna
(74) *Attorney, Agent, or Firm* — McCormick, Paulding & Huber PLLC

(57) ABSTRACT

A tube assembly (12) including an inner tube (13) having an outer thread (15), an outer tube (14) having an inner thread (16) engaging the outer thread (15), at least for securing an angular position between the inner tube (13) and the outer tube (14) is provided. Such a tube assembly should facilitate mounting and maintenance of a reverse osmosis system. To this end, the inner tube (13) includes at least an groove (17) on its outer surface and the outer tube (14) includes an recess (18) on its inner surface, wherein a blocking element is arranged in a space formed by the recess (18) and the groove (17) in overlapping relation with the groove (17) and the recess (18).

23 Claims, 3 Drawing Sheets

(56) References Cited

U.S. PATENT DOCUMENTS

| | | | | |
|---|---|---|---|---|
| 5,363,931 | A | * | 11/1994 | Moriarty ............... F16L 7/00 175/325.5 |
| 5,544,922 | A | * | 8/1996 | Shumard ............ F16L 23/024 285/23 |
| 6,520,547 | B2 | | 2/2003 | Robinson |
| 6,860,514 | B2 | | 3/2005 | Wentworth et al. |
| 9,080,395 | B2 | | 7/2015 | Hermes et al. |
| 9,163,671 | B2 | | 10/2015 | Hermes et al. |
| 9,714,731 | B2 | * | 7/2017 | O'Dell ................. F16L 15/08 |
| 10,077,858 | B2 | * | 9/2018 | Pallini, Jr. ............ F16L 15/08 |
| 10,605,012 | B2 | * | 3/2020 | Loose-Mitchell ..... F16L 15/08 |
| 2004/0052639 | A1 | | 3/2004 | Al Hawaj |
| 2006/0245909 | A1 | * | 11/2006 | Stover ................. F04F 13/00 415/1 |
| 2009/0261575 | A1 | * | 10/2009 | Bull .................. F16L 27/1275 285/119 |
| 2011/0008182 | A1 | * | 1/2011 | Krogsgard ............ F04F 13/00 417/63 |
| 2011/0260445 | A1 | * | 10/2011 | Watterson, II ....... E21B 17/043 285/91 |
| 2013/0280038 | A1 | * | 10/2013 | Martin ................. F03B 13/00 415/110 |
| 2019/0024829 | A1 | | 1/2019 | Potier |
| 2019/0256382 | A1 | * | 8/2019 | Sambi .................. C02F 1/441 |
| 2021/0239241 | A1 | * | 8/2021 | Mullins ............... F16L 27/127 |

* cited by examiner

TUBE ASSEMBLY, PRESSURE EXCHANGER AND REVERSE OSMOSIS SYSTEM

CROSS-REFERENCE TO RELATED APPLICATION

This application claims foreign priority benefits under 35 U.S.C. § 119 to European Patent Application No. 20215491.0 filed on Dec. 18, 2020, the content of which is hereby incorporated by reference in its entirety.

TECHNICAL FIELD

The present invention relates to a tube assembly comprising an inner tube having an outer thread, an outer tube having an inner thread engaging the outer thread and means for securing an angular position between the inner tube and the outer tube.

Furthermore, the invention relates to a pressure exchanger and a reverse osmosis system comprising such a pressure exchanger.

BACKGROUND

The invention is described with reference to a reverse osmosis system which is used, for example, for the desalination of salt water or for the waste water treatment. To this purpose liquid under a high pressure is pumped into a high-pressure chamber of the reverse osmosis system which is limited by a membrane. Part of the liquid penetrates through the membrane and enters a low-pressure chamber in which desalinated or purified liquid can be gained. The liquid in the high-pressure chamber having a higher concentration of salt is outputted from the high-pressure chamber. However, in order not to waste the energy, which was necessary to produce the higher pressure, the high-pressure liquid is supplied to a pressure exchanger which transfers the high pressure to fresh liquid to be desalinated or treated.

In a reverse osmosis system there are one or more pressure exchangers. Each pressure exchanger must be connected to four connections on a manifold system, i.e. on two low-pressure manifolds and two high-pressure manifolds. In the high-pressure manifolds the pressure is typically around 60 barg.

A connection between a manifold and a port of a pressure exchanger can be established by means of a tube assembly. However, in order to have a pressure-tight connection, the tube assembly must have a length which is adapted precisely to the distance between the manifold of the reverse osmosis system and the pressure exchanger. It is a defacto industry standard to use pipes with grooves, that are assembled with clamps that engage in the grooves, i.e. grooved connections. The length of the pipes used for the connections must be precise enough that it is possible to securely engage the clamps into the grooves on the pipes, Furthermore, when these grooved connections are pressurized to high pressures, they will extend themselves with high force until the clamps engage the sides of the grooves in the pipes. The high forces that act to extend the grooved connections can dislocate or damage connected equipment. These are the reasons that the length of the tube assembly must be adapted precisely.

Because of fabrication tolerances on especially the big manifolds of the reverse osmosis system, the distances from the pressure exchangers to the mounting connections on the manifolds of the reverse osmosis system vary a bit. However, the length of the tube assemblies each must be adapted with very small tolerances, i.e. in the order of tenths of millimetres. The same applies if the pressure exchangers have been demounted for service purposes. Normally, this adaption is made by making the tube pieces in individual length. However, it is difficult to keep tracks on all these tube pieces and normally it takes a lot of time to make these connections in such an installation.

SUMMARY

The object underlying the invention is to facilitate mounting and maintenance of a reverse osmosis system.

This object is solved with a tube assembly as described at the outset in that the inner tube comprises at least one groove on its outer surface and the outer tube comprises an recess on its inner surface, wherein a blocking element is arranged in a space formed by the recess and the groove in overlapping relation with the groove and the recess.

The use of the inner thread in the outer tube and the outer recess at the outer tube allows an adjustment of the length of the tube assembly. Once the suitable length is adjusted, the blocking element can be mounted in overlapping relation with the groove and the recess, so that it is no longer possible to rotate the two tubes in relation to each other.

In an embodiment of the invention the recess is in form of an inner groove which is open to a front face of the outer tube. In this way it is possible to insert the blocking element from the front face of the outer tube once the outer groove and the inner tube have been brought in a fully overlapping relation. To differentiate between the inner groove in the outer tube and the groove on the outside of the inner tube, the last mentioned groove is termed "outer groove".

In an embodiment of the invention the blocking element is in form of a nut, wherein a screw penetrating the outer tube is threaded into the nut. When the screw is threaded into the nut, the nut is secured against a movement out of the outer groove and the recess. The screw penetrates the outer tube, i.e. it can be handled from the outside.

In an embodiment of the invention the outer tube comprises an opening through which the screw is threaded into the nut. As long as the screw is threaded into the nut it cannot get lost, since the screw is surrounded about the whole circumference by the outer tube.

In an embodiment of the invention the blocking element comprises in circumferential direction of the tubes a width corresponding to the width of the inner recess and the width of the outer groove in circumferential direction. Once the blocking element is inserted into the space formed by the inner recess and the outer groove there is no more a possibility for the tubes to be rotated in relation to each other.

In an embodiment of the invention at least one of the grooves is an axial groove. This facilitates the insertion of the blocking element.

In an embodiment of the invention the outer groove has an end at the side of the outer thread, wherein the end and the outer thread have a predetermined distance to each other. This is a simple way to make sure that the overlapping relation between the two tubes does not fall under a minimum overlapping. When the overlapping between the two tubes is too small the screw can no longer reach the nut which is a clear indication that the outer tube has threaded too far and the worker can immediately make a correction of the length of the tube assembly.

In an embodiment of the invention the inner tube comprises an inner end arranged in the outer tube, wherein a sealing ring is arranged between the inner end and the outer thread. This has the technical effect that the thread is not exposed to media running through the tube assembly and therefore the thread cannot corrode.

In an embodiment of the invention the sealing ring is fixed in the outer tube. This means that the sealing ring moves together with the outer tube in relation to the inner tube.

In an embodiment of the invention the sealing ring is a first sealing ring, wherein the outer tube comprises a drain hole and a second sealing ring is arranged on a side of the drain hole opposite the first sealing ring. The two sealing rings have a drain hole between them which makes it visible if the second sealing ring is failing and at the same time the first sealing ring ensures tightness towards the thread.

In an embodiment of the invention the inner tube comprises more than one outer groove. Thus, a fine adjustment is possible which is not limited to a complete revolution of the inner tube and the outer tube in relation to each other.

In an embodiment of the invention the thread has a pitch of 2 mm per revolution or less. In other words, the thread is a fine thread. When the inner tube and the outer tube are rotated by one revolution, the length of the tube assembly is changed by 2 mm or less. When, for example six outer grooves are provided on the inner tube, an adjustment in the magnitude of ⅖ mm or ⅓ mm is possible. When the thread has a finer or smaller pitch or more outer grooves are provided, the resolution can even be increased.

The invention relates also to a pressure exchanger comprising a high-pressure input port, a low-pressure output port, a low-pressure input port, and a high-pressure output port, wherein at least one of the ports is connected to a tube assembly as described above.

Furthermore, the invention relates to a reverse osmosis system comprising such a pressure exchanger.

BRIEF DESCRIPTION OF THE DRAWINGS

An embodiment of the invention will now be described in more detail with reference to the drawing, wherein.

DETAILED DESCRIPTION

Figure 1:
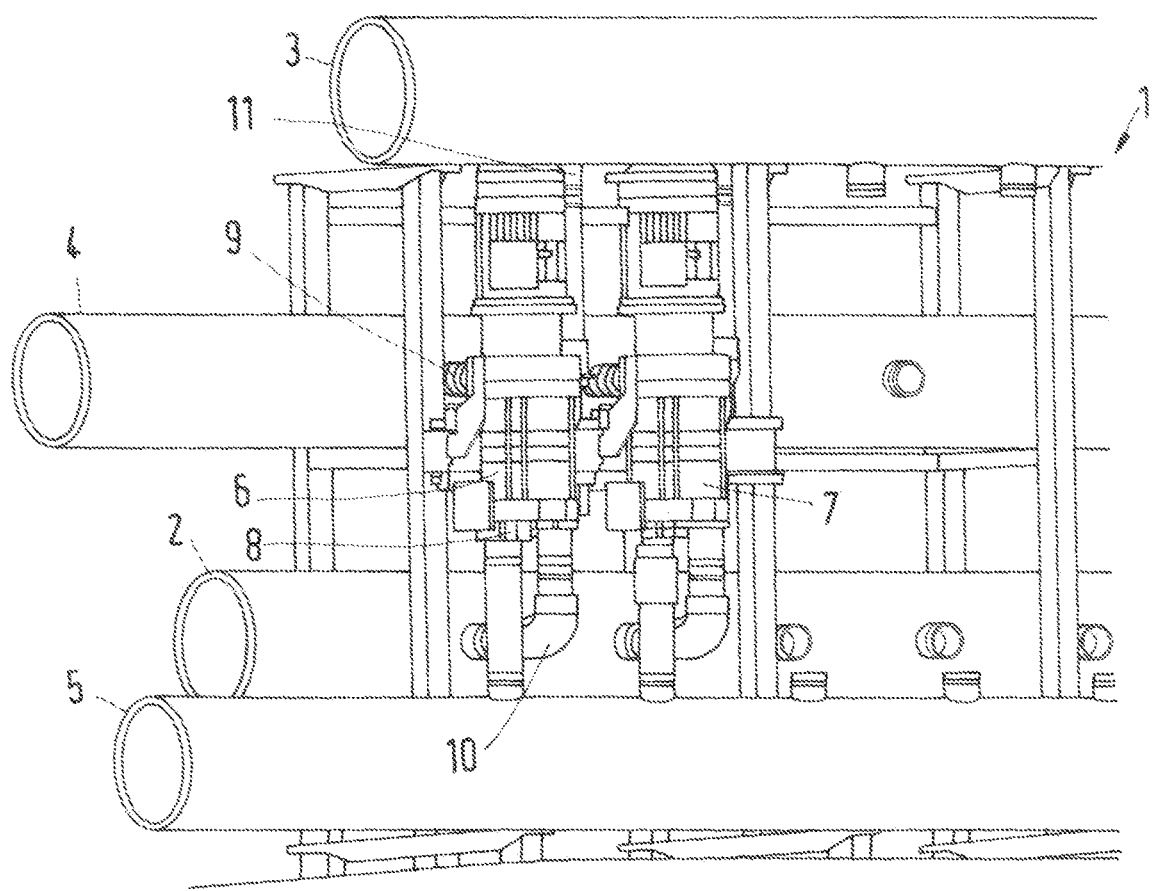
FIG. 1 shows schematically a part of a reverse osmosis system.
Figure 2:
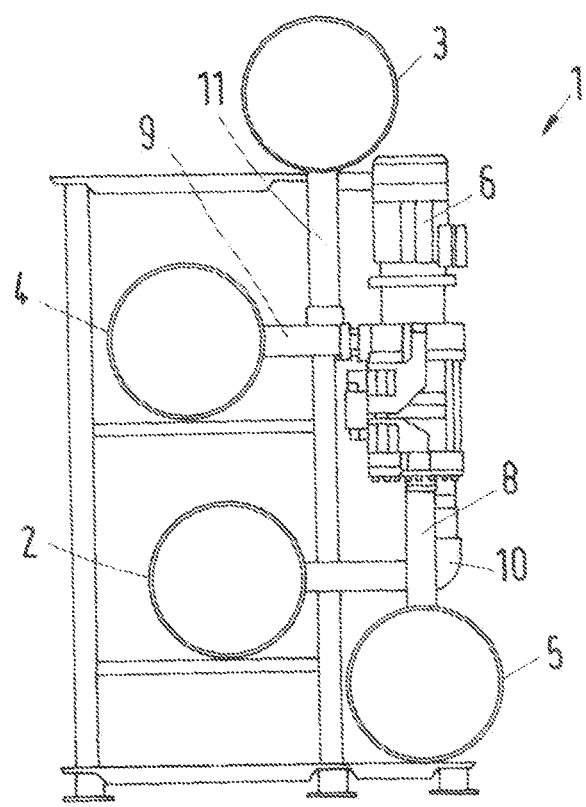
FIG. 2 shows schematically a sectional view of the part of the reverse osmosis system.
Figure 3:
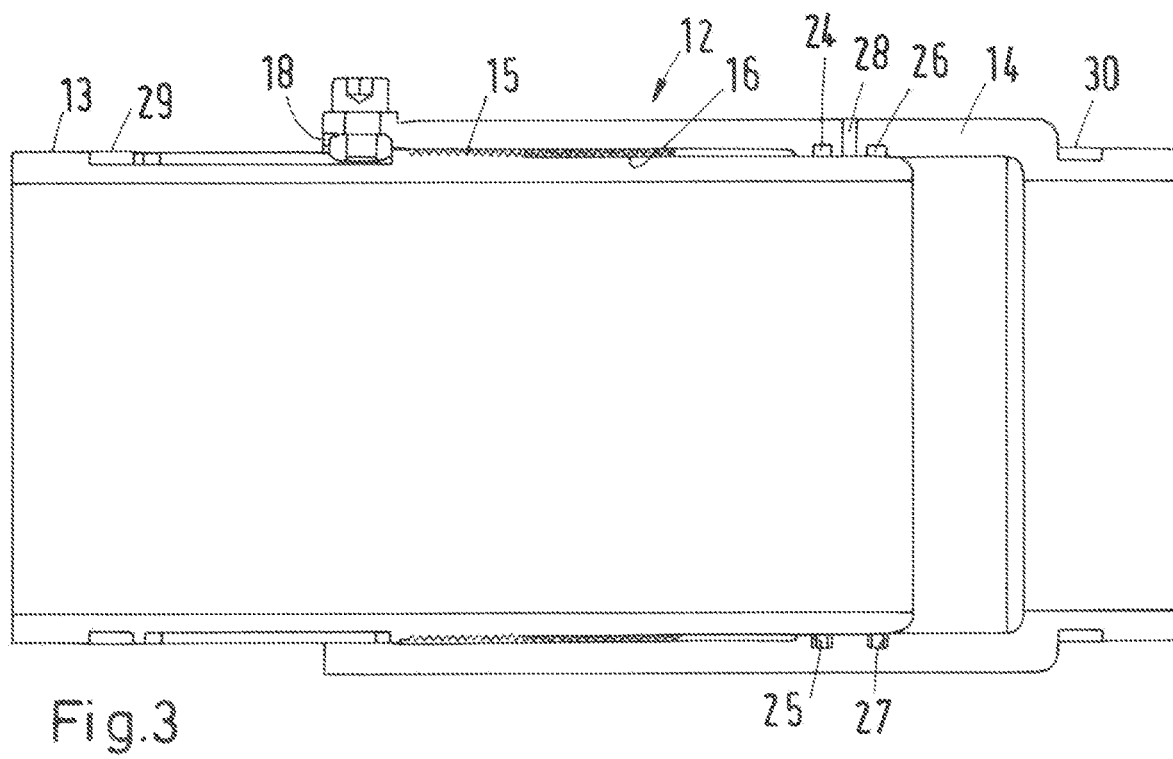
FIG. 3 shows a sectional view of a tube assembly.

FIG. 1 shows schematically a part 1 of a reverse osmosis system having low-pressure manifolds 2, 3 and high-pressure manifolds 4, 5. Furthermore, the part 1 comprises two pressure exchangers 6, 7. Each pressure exchanger 6, 7 comprises a high-pressure input 8, a high-pressure output 9, a low-pressure input 10 and a low-pressure output 11. The connection between the pressure exchanger 6 and at least one of the manifolds 2-5 is made by means of one or more tube assemblies 12 one of which is shown in more details in FIGS. 3 to 7.

In a preferred embodiment all connections between the pressure exchanger 6, 7 and the manifolds 2-5 comprise such a tube assembly 12. However, this is not an absolute requirement.

The tube assembly 12 comprises an inner tube 13 and an outer tube 14. The inner tube 13 comprises an outer thread 15. The outer tube 14 comprises an inner thread 16. The outer tube 14 is threaded with its inner thread 16 onto the inner tube 13 having the outer thread 15.

When the outer tube 14 is rotated in relation to the inner tube 13, the length of the tube assembly 12 varies in relation to the pitch of the threads 15, 16. The threads 15, 16 are fine threads having a pitch of 2 mm revolution or less. This means, that for each revolution of the outer tube 14 in relation to the inner tube 13 the length of the tube assembly 12 varies by 2 mm or less.

It is, however, not only necessary to adjust the length of the tube assembly 12. A further requirement is that the adjusted length does not change after the adjustment.

In order to block the tube assembly 12 after the adjustment of the length against a further change of the length, the inner tube 13 comprises at least an outer groove 17 on its outer surface. The outer groove 17 is preferably an axial groove running parallel to an axis of the inner tube 13 and the outer tube 14.

The outer groove 17 ends a distance before the outer thread 15.

Figure 4:
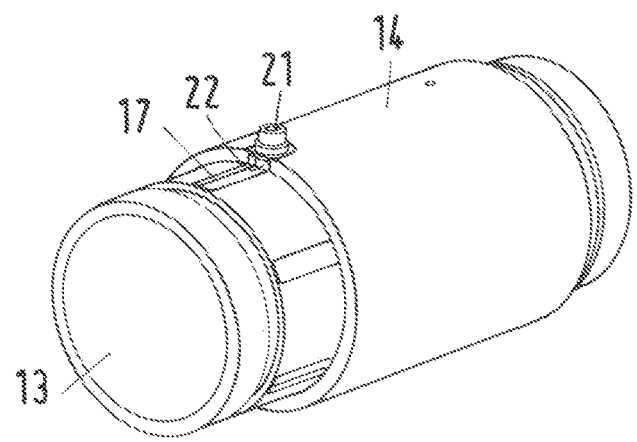
FIG. 4 shows a perspective view of the tube assembly.
Figure 5:
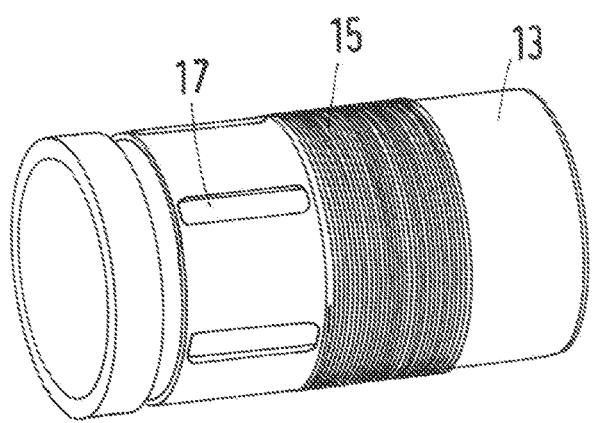
FIG. 5 shows a perspective view of an inner tube.
Figure 6:
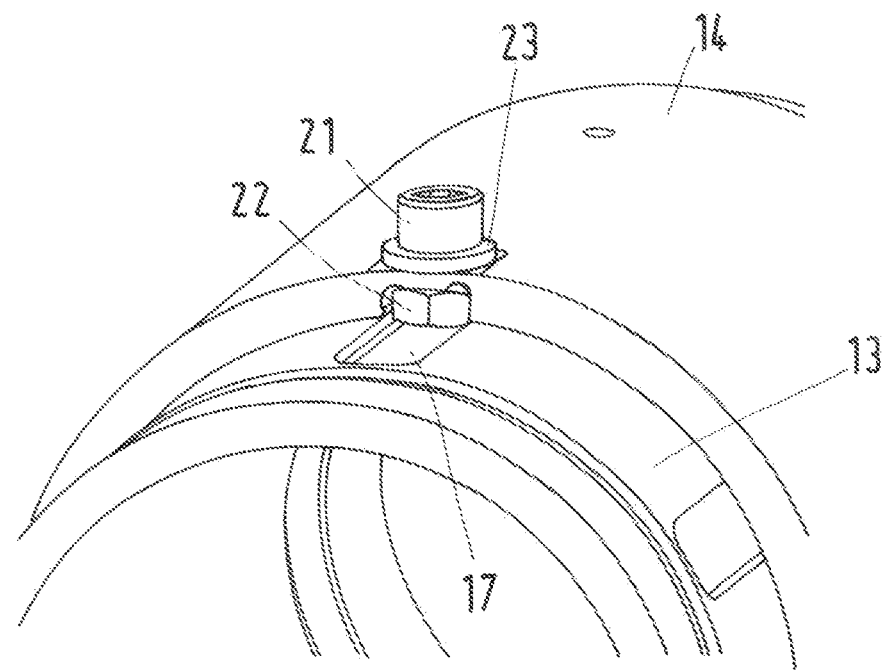
FIG. 6 shows an enlarged view of a blocking means.
Figure 7:
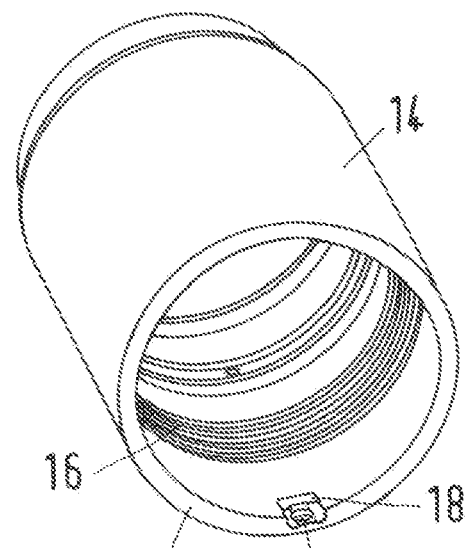
FIG. 7 shows a perspective view of an outer tube of the tube assembly.

As can be seen in particular in FIGS. 4 to 6, there are a number of outer grooves 17 on the outer surface of the inner tube 13. It is, for example, possible to provide six outer grooves 17 on the outer surface of the inner tube 13.

The outer tube comprises an inner recess 18 on the inner side of the outer tube 14. The inner recess 18 can also be in form of a groove. This inner recess 18 is open to a front face 19 of the outer tube 14.

The outer tube 14 comprises an opening 20 at the position of the inner recess 18. As can be seen in FIG. 6, a screw 21 is put into the opening 20.

A blocking element in form of a nut 22 is arranged in the outer groove 17 and then pushed through the front face 19 into the inner recess 18. When the nut 22 has reached the desired position, the screw 21 can be screwed into the nut 22. This is possible, when the outer groove 17 and the inner recess 18 overlap each other.

The nut 22 (or any other blocking element) has a width in circumferential direction which corresponds to the width of the outer groove 17 in circumferential direction and to the width of the inner recess 18 in circumferential direction. Thus, when the nut 22 is inserted into a space which is formed by the outer groove 17 and the inner recess 18, there is no longer a possibility for a rotational movement of the outer tube 14 in relation to the inner tube 13.

The screw 21 secures the nut 22 from being moved out of this space.

Since the outer groove 17 ends with a distance to the outer thread 15, the outer groove 17 forms at the same time a safety means for ensuring that the overlap between the inner tube 13 and the outer tube 14 cannot fall below a predetermined length. When the outer tube has been screwed too far, the nut 22 can no longer be moved in overlapping relation to the opening 20 so that the screw 21 cannot be screwed into the nut 22. This is a clear indication for the person installing the tube assembly 12 that the overlapping is too small.

Furthermore, a washer 23 is arranged between a head of the screw 21 and the outer tube 14. The type of washer can be chosen to be of a type that prevents loosening of the screw due to vibrations.

A first sealing ring 24, for example in form of an O-ring, is arranged in a circumferential groove 25 in the inside of the outer tube 14. The first sealing ring 24 is located on a side of the inner thread 16 opposite the opening 20. Furthermore, the outer tube 14 comprises a second sealing ring 26 arranged in a second circumferential groove 27. A drain hole 28 is located between the two sealing rings 24, 26.

The two sealing rings 24, 26 form a seal for a medium flowing through the tube assembly 12 so that this medium cannot reach the threads 15, 16 and therefore the threads 15, 16 cannot corrode. Furthermore, the drain hole 28 makes it visible if the second sealing ring 26 is failing. In this case the first sealing ring 24 secures tightness towards the threads 15, 16.

The inner tube has a first circumferential groove 29 at its end and the outer tube 14 has a second circumferential groove 30 near the end. However, another solution is possible, for example a mounting flange in one end and a circumferential groove in another end or mounting flanges at both ends.

One part of the described tube assembly could be an integrated part of for example the port of the pressure exchanger.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A tube assembly comprising an inner tube having an outer thread, an outer tube having an inner thread engaging the outer thread, and means for securing an angular position between the inner tube and the outer tube, wherein the inner tube comprises at least a groove on its outer surface and the outer tube comprises a recess on its inner surface, wherein a blocking element is arranged in a space formed by the recess and the groove in overlapping relation with the groove and the recess, wherein the blocking element is in form of a nut, and wherein a screw penetrating the outer tube is threaded into the nut.

2. The tube assembly according to claim 1, wherein the recess is in form of an inner groove which is open to a front face of the outer tube.

3. The tube assembly according to claim 1, wherein the outer tube comprises an opening through which the screw is threaded into the nut.

4. The tube assembly according to claim 1, wherein the blocking element comprises in circumferential direction of the tubes a width corresponding to the width of the recess and the width of the groove in circumferential direction.

5. The tube assembly according to claim 1, wherein at least one of the grooves is an axial groove.

6. The tube assembly according to claim 1, wherein the groove has an end at the side of the outer thread, wherein the end and the outer thread have a predetermined distance to each other.

7. The tube assembly according to claim 1, wherein the inner tube comprises an inner end arranged in the outer tube, wherein a sealing ring is arranged between the inner end and the outer thread.

8. The tube assembly according to claim 7, wherein the sealing ring is fixed in the outer tube.

9. The tube assembly according to claim 7, wherein the sealing ring is a first sealing ring, wherein the outer tube comprises a drain hole and a second sealing ring is arranged on a side of the drain hole opposite the first sealing ring.

10. The tube assembly according to claim 1, wherein the inner tube comprises more than one groove.

11. The tube assembly according to claim 1, wherein the thread has a pitch of 2 mm per revolution or less.

12. A pressure exchanger comprising a high pressure input port, a low pressure output port, a low pressure input port, and a high pressure output port, wherein at least one of the ports is connected to a tube assembly according to claim 1.

13. A reverse osmosis system comprising a pressure exchanger according to claim 12.

14. The tube assembly according to claim 1, wherein the outer tube defines an opening at the position of the recess.

15. The tube assembly according to claim 14, wherein the blocking element is in form of a nut, wherein a screw penetrating the outer tube is threaded into the nut.

16. The tube assembly according to claim 14, wherein a size of the opening in a circumferential direction of the outer tube is a smaller width than a width of the blocking element in the circumferential direction.

17. A tube assembly comprising an inner tube having an outer thread, an outer tube having an inner thread engaging the outer thread, and means for securing an angular position between the inner tube and the outer tube, wherein the inner tube comprises at least a groove on its outer surface and the outer tube comprises a recess on its inner surface, wherein a blocking element is arranged in a space formed by the recess and the groove in overlapping relation with the groove and the recess, and wherein the inner tube comprises an inner end arranged in the outer tube, wherein a sealing ring is arranged between the inner end and the outer thread.

18. The tube assembly according to claim 17, wherein the sealing ring is fixed in the outer tube.

19. The tube assembly according to claim 17, wherein the sealing ring is a first sealing ring, wherein the outer tube comprises a drain hole and a second sealing ring is arranged on a side of the drain hole opposite the first sealing ring.

20. A tube assembly comprising an inner tube having an outer thread, an outer tube having an inner thread engaging the outer thread, and means for securing an angular position between the inner tube and the outer tube, wherein the inner tube comprises at least a groove on its outer surface and the outer tube comprises a recess on its inner surface, wherein a blocking element is arranged in a space formed by the recess and the groove in overlapping relation with the groove and the recess, and wherein the inner tube comprises more than one groove.

21. A pressure exchanger comprising a high pressure input port, a low pressure output port, a low pressure input port, and a high pressure output port, wherein at least one of the ports is connected to a tube assembly comprising an inner tube having an outer thread, an outer tube having an inner thread engaging the outer thread, and means for securing an angular position between the inner tube and the outer tube, wherein the inner tube comprises at least a groove on its outer surface and the outer tube comprises a recess on its inner surface, wherein a blocking element is arranged in a space formed by the recess and the groove in overlapping relation with the groove and the recess.

22. A reverse osmosis system comprising a pressure exchanger according to claim 21.

23. A tube assembly comprising an inner tube having an outer thread, an outer tube having an inner thread engaging the outer thread, and means for securing an angular position between the inner tube and the outer tube, wherein the inner tube comprises at least a groove on its outer surface and the outer tube comprises a recess on its inner surface, wherein a blocking element is arranged in a space formed by the recess and the groove in overlapping relation with the groove and the recess, wherein the outer tube defines an opening at the position of the recess, and wherein a size of the opening in a circumferential direction of the outer tube is a smaller width than a width of the blocking element in the circumferential direction.

\* \* \* \* \*